ELECTRICAL MEMORY SYSTEM UTILIZING FREE CHARGE STORAGE

Filed Dec. 3, 1956

INVENTORS
HEINE ANDRIES RODRIGUES DE MIRANDA
THEODORUS JOANNES TULP
WILHELMUS ANTONIUS JOSEPH MARIE ZWIJSEN
BY
Fred M. Vogel
AGENT United States Patent Office 2,991,374

Patented July 4, 1961

2,991,374

ELECTRICAL MEMORY SYSTEM UTILIZING FREE CHARGE STORAGE

Heine Andries Rodrigues de Miranda, Theodorus Joannes Tulp, and Wilhelmus Antonius Joseph Marie Zwijsen, all of Eindhoven, Netherlands, assignors, by mesne assignments, to North American Philips Company, Inc., New York, N.Y., a corporation of Delaware Filed Dec. 3, 1956, Ser. No. 625,726

Claims priority, application Netherlands Dec. 7, 1955

14 Claims. (Cl. 307—88.5)

This invention relates to memory systems which comprise a plurality of electrical memory elements controlled by control pulses.

Known systems of this type utilize, for example, magnetic cores in which the polarity of the remanent magnetism is reversible by the action of a control pulse (clock-pulse) thus causing the production or nonproduction of a pulse in a "read-out" winding in response to an input (read-in) pulse which affects the initial condition of magnetization. For this purpose, crystal rectifiers have alternatively been employed in lieu of the magnetic cores, in which the presence or absence of free-charge carriers is used as a memory feature.

These known systems have the disadvantage, that, although the control pulses supply energy for the change-over from one memory condition to the other, the read-out pulses invariably have an energy-storage or a current amplitude smaller than the "read-in" pulses. This often requires additional amplifier elements or transformers if the read-out pulse produced is to be used as a read-in pulse for a next memory element such as is the case, for example, in the shift registers and counting circuit arrangements of electric computers.

Alternatively, electrical trigger circuit arrangements are often used as memory elements, and may comprise, for example, electron-discharge tubes, point-contact transistors or junction transistors. In practice, however, point-contact transistors often prove to be insufficiently reliable for this purpose. The use of electron-discharge tubes has the disadvantage of a higher energy dissipation, and junction transistors have the disadvantage that the switching frequency is limited to a lower value than is achieved in the system according to the invention.

An object of the invention is to provide an improved and simplified memory circuit. Other objects are to provide a memory circuit which does not require a source of D.-C. operating potential, which is economical to operate, and which can function rapidly. Still other objects will be apparent.

The present invention utilizes transistors having emitter-collector circuits to which the control pulses are fed, and the production of an output pulse in response to the control pulse depends upon the presence of an electrical free charge stored in the base-zone of each transistor and acting as a memory. This output pulse is fed to the base of the next transistor, through a rectifier which has the same pass-direction as the base and which permits the base to be at a floating potential, thus producing a free charge stored in the base-zone of this next transistor.

The invention is based on recognition of the fact that a considerable storage of free charges in the base-zone of the transistors can be achieved by meansofcompara-
of the transistors can be achieved by means of comparatively little energy and current. This storage of freely movable electrons and holes persists for a comparatively long time, say approximately 50 microseconds, and persists for a longer period of time the lower the rate of recombination of the pairs of electrons and holes in the base-region. When a control pulse is supplied to the collector of a transistor with such a free charge stored in the base-zone, the transistor becomes conductive, only a very small part of this conductivity being at the cost of the free charge in the base-zone, since the emitter of the transistor emits fresh free charges into the base-zone during this conductive condition. Consequently, the amplitude of the "read-out" current pulse considerably exceeds that of the "read-in" current pulse by means of which the free charge in the base-zone was produced. The permissible time between these two pulses is limited by the recombination time of the pairs of electrons and holes in the base-zone, for example, 50 microseconds, which time is usually sufficient in practical high-speed systems. In order to employ these effects to advantage, the base, particularly during the occurrence of the control-pulse, should be at a floating potential and for this purpose an isolating rectifier is connected in series with the base.

In order that the invention may be readily carried into effect, a few embodiments will now be described in detail with reference to the accompanying drawing, in which.

Figure 1:
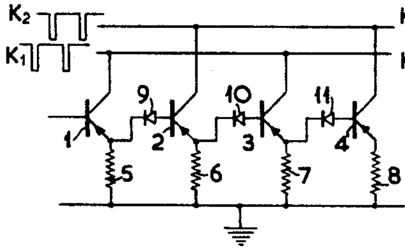
FIG. 1 is a schematic diagram of the invention for use in a shift register.

The shift register shown in FIG. 1 comprises, as memory elements, a number of pnp-type transistors 1, 2, 3, 4 and so on, for example of the Philips type OA72, the collectors of which are alternately supplied with negative control-pulses (clock pulses) $K_1$ and $K_2$ occurring alternately with respect to time. These control pulses which sometimes are called "advance" or "shift" pulses, are supplied by generators preferably having a negligible internal resistance and synchronized to produce pulses out-of-phase. Alternatively, one pulse generator can be used to produce one set of pulses and the other set of pulses can be derived therefrom through a suitable delay line.

The source of operating direct voltage, as usually employed in transistor circuits, is dispensed with and is unnecessary in the circuit according to the invention.

The emitters of the transistors are connected to electrical ground through resistors 5, 6, 7 and 8, respectively, having, for example, values of 100 ohms. The emitters also are respectively connected through rectifiers 9, 10 and 11, for example of the Philips type OA71 or OA81, to the bases of succeeding transistors, the polarities of the rectifiers being the same as those of the associated bases.

The system operates as follows:

Assuming a free charge to exist in the base-zone of the transistor 1, which free charge can be produced, for example, by driving the base temporarily negative with respect to the emitter by means of a preceding transistor or by other pulsatory means, then a current will pass from the emitter to the collector when the control pulse $K_1$ occurs. This current produces, across the emitter resistor 5, a voltage drop substantially corresponding to the control pulse $K_1$ and causing a current pulse to pass via the rectifier 9 to the base of the transistor 2. The collector of the transistor 2 then being at ground potential (since the control pulse $K_2$ occurs at times other than the control pulse $K_1$), this base-current pulse passes through the emitter and, moreover, for a considerable part through the collector, of the transistor 2. This current pulse dislodges free charge carriers in the form of electron-hole-pairs in the base-zone of the transistor 2.

Upon termination of the control pulse $K_1$, the current pulse through the base of the transistor 2 also terminates, so that the base is subsequently allowed to assume a free-charge arbitrary negative potential due to the blocking effect of the rectifier 9, in other words this base has a floating potential. This freecharge storage of the base-zone persists during the recombination time of the electron-hole-pairs.

At the instant at which the control pulse $K_2$ occurs, by means of which the collector of the transistor 2 is driven negative, this free charge in the base-zone will allow a current to pass from the emitter to the collector of the transistor 2, thereby producing across the emitter resistor 6 a voltage drop substantially corresponding to the control pulse $K_2$, and hence a corresponding current pulse passes via the rectifier 10 to the base of the transistor 3.

The free charge initially present in the base-zone of the transistor 1 has consequently caused the production of a free charge in the base-zone of the transistor 2 after occurrence of the control pulse $K_1$, which in turn has caused the production of a free charge in the base-zone of the transistor 3 after occurrence of the control pulse $K_2$. After the next control pulse $K_1$ is supplied to the collector of the transistor 3, a free charge will consequently be produced in the base-zone of the transistor 4, and so on. This free charge of the base-zones, acting as a positive memory indication, is consequently passed on to the next transistor upon the occurrence of each control pulse. If one or a plurality of the transistors have no free charge in the base-zones, no current pulse is supplied to the base of the next transistor, hence this negative memory indication is likewise passed on to the next transistor.

The system may be used as a shift-register. When either impressing or not impressing a free charge on the base of the transistor 1 by means of "read-in" pulses in successive cycles and according to a given code, this information will shift in succession to the next memory elements as a result of the control pulses. Alternatively, a free charge may simultaneously be impressed, according to a given code, on the bases of a number of transistors, for example by supplying a negative pulse to all of the bases concerned, the information then recorded in the register advancing one memory element after each control pulse cycle.

In accordance with the invention the control pulses supplied to the successive transistors must, of course, occur with a rapidity such that the free charges stored as memory information in the transistor bases will not have dissipated, between the occurrences of the successive transistor control pulses, to an extent that would render the memory feature ineffective. The "read-out" pulses are preferably derived from the emitter of the last transistor.

It has been assumed above that the free charge stored in each transistor disappears in the time interval between two control pulses supplied to any one transistor, which means that this time interval should approximately correspond to said recombination time. Often, however, this free charge should be neutralized or dissipated sooner. To accomplish this, positive-polarity erase pulses may be supplied via separating rectifiers to the bases of the transistors within said time intervals, for example in the manner illustrated in FIG. 2, the descending edges of the control pulses $K_1$ and $K_2$, respectively, being differentiated by means of capacitors 15, 16, 17 having values of, say 4000 pf. and resistors 18, 19, 20 having values of, say, one thousand ohms, and supplied through separating rectifiers 21, 22, 23 to the respective bases. The resistance-capacity combinations 15—18 and 17—20 associated with a control pulse ($K_1$) may, as shown in FIG. 3, be united to form one combination 27, 28.

In a suitable embodiment of the invention, with the aforesaid values of the components, the pulse repetition frequency was 50 kc./s. and the pulse width 5/μsec.

Figure 2:
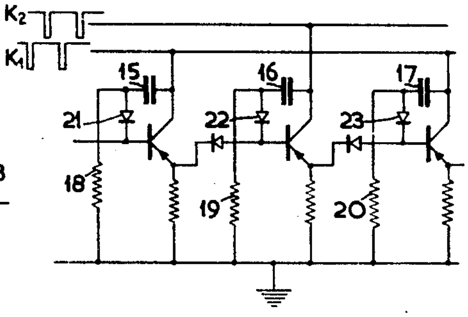
FIGS. 2 and 3 are schematic diagrams of improvements of FIG. 1.
Figure 3:
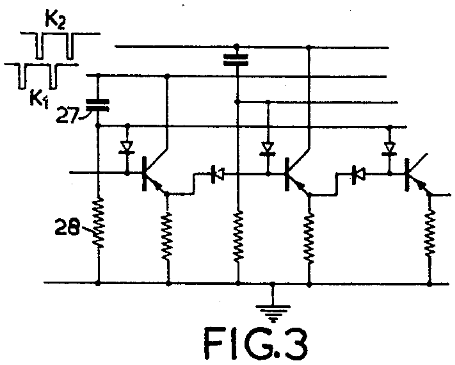

The shift-registers shown in FIGS. 1 and 2 may be converted into a ring counter by coupling the output of the transistor cascade to its input. A simple example of such a ring counter is the trigger circuit comprising two transistors shown in FIG. 4. The transistors 31 and 32 are coupled together through rectifiers 33 and 34 between the base of one transistor and the emitter of the other transistor. Control pulses $K_1$ and $K_2$ are again supplied at different instants to the collectors.

The operation is as follows: Assuming the base-zone of the transistor 31 to contain a free charge, this free charge will, at the instant at which the control pulse $K_1$ occurs, allow a current to pass through the transistor 31 and its emitter resistor 35, thus producing, through the rectifier 34, a free charge in the base-zone of the transistor 32. As a result the transistor 32 will be conductive during occurrence of the control pulse $K_2$ and will in turn produce a free charge in the base-zone of the transistor 31 due to the voltage drop across its emitter resistor 36, via the rectifier 33. Hence, the transistors alternately become conductive.

Figure 5:
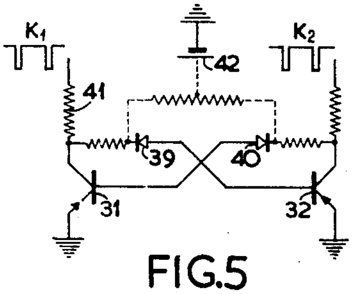
FIG. 5 is a variation of FIG. 4.

FIG. 5 shows such a trigger circuit arrangement with a collector-base coupling between the transistors 31 and 32, via rectifiers 39 and 40. In the presence of a free charge stored in the base-zone of the transistor 31, this transistor will pass a current in response to pulse $K_1$ which produces, across the collector-resistor 41, a voltage drop approximately corresponding to the value of the control pulse $K_1$, so that the pulse supplied to the base of the transistor 32 is negligible and consequently unable to produce any appreciable free charge in the base-zone of the transistor 32. If required, this pulse can be completely suppressed by means of a low positive threshold voltage from a source 42. If the transistor 31 had no free charge in its base-zone, the control pulse $K_1$ would produce, via the rectifier 39, a free charge in the base-zone of the transistor 32, after which the control pulse $K_2$ would not change this condition. Hence, in contradistinction to conventional trigger circuits with a collector-base coupling only one transistor remains conductive upon the occurrence of pulses.

Figure 4:
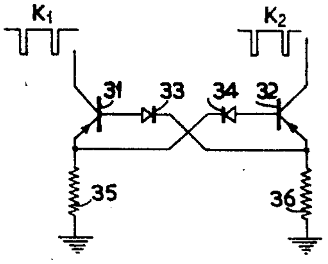
FIG. 4 is a schematic diagram of a variation of FIG. 1 which may be used as a ring-counter.

It will be evident that in the circuits shown in FIGS. 4 and 5 the residual free charge can be neutralized by means of an opposite pulse on the base after each control pulse similarly to the arrangement shown in FIG. 2.

Figure 6:
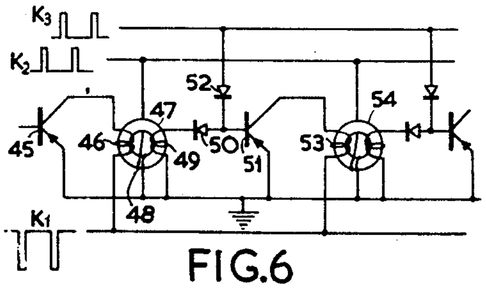
FIG. 6 is another example of the invention for use in a shift register.

The aforesaid circuit arrangements have the property that the memory persists for a limited time. In order for this memory to persist for a practically indefinite time, if required, use may be made of static magnetic trigger units, as shown in FIG. 6, in which the collector of the transistor 45 is connected through a winding 46 of a magnet core 47 to a source from which a negative control pulse $K_1$ is supplied. This core 47 has a winding 48 to which a control pulse $K_2$ is supplied, and furthermore has a third winding 49 which is connected through a rectifier 50 to the base of a next transistor 51 of the circuit. A positive control pulse $K_3$ is supplied to this base by way of a rectifier 52, the value of the potential of the connection to the source of pulses $K_3$ between such pulses preferably being negative and consequently constituting a threshold for the rectifier 52. The control pulses $K_2$, $K_1$ and $K_3$ occur successively in said sequence. If desired, the control pulse $K_3$ may alternatively be derived from the control pulse $K_1$ by means of a differentiating network as described with reference to FIG. 3.

The system operates as follows:

If the transistor 45 has a free charge stored in its base-zone, a current will pass through the winding 46 during the occurrence of the control pulse $K_1$, which current brings the magnet core into a corresponding condition of magnetization. At the instant at which the control pulse $K_2$ occurs, this condition of magnetization will change its sign, thus producing a corresponding pulse in the winding 49, which pulse produces via a rectifier 50 a free charge in the base-zone of the transistor 51. At the instant at which the control pulse $K_1$ re-occurs, a current passing through the collector winding 53 of the transistor 51, brings the associated magnet core 54 into a corresponding condition of magnetization. The next control pulse $K_3$ subsequently neutralizes the free charge stored in the transistor 51, via the rectifier 52. The core 54 carries windings corresponding to those on the core 47 so that the system functions as a shift-register for shifting the information from one stage to the next.

By connecting resistors in parallel with the emitter-collector paths of the transistors 45, 51 . . ., respectively, (not shown), a preliminary current through the cores 47, 54 . . . is produced during the occurrence of the control pulse $K_1$, which current in itself must not be high enough to change over the cores into the condition of magnetization, but raises the change-over sensitivity considerably.

Figure 7:
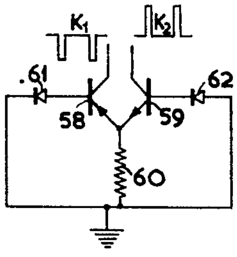
FIG. 7 is a variation of FIGS. 4 and 5 comprising transistors of opposite conductivity type.

The systems referred to may alternatively comprise combinations of npn- and pnp-type transistors. FIG. 7 shows a trigger circuit comprising such a combination. It comprises a transistor 58 of the pnp-type, to which negative control pulses $K_1$ are supplied, and a transistor 59 of the npn-type to which positive control pulses $K_2$ are supplied, which pulses occur at different instants. The emitters of the two transistors are coupled together through a common emitter resistor 60, while the bases are connected to ground through rectifiers 61 and 62, respectively, the pass-directions of which correspond to those of the associated bases. If the transistor 58 has a free charge stored in its base, the voltage drop across the resistor 60 during the control pulse $K_1$ will produce, via the rectifier 62, a free charge in the base-zone of the transistor 59. Hence, a free charge will be stored in the base-zone of the transistor 58 in response to the control pulse $K_2$, and so on. Consequently, the transistors 58 and 59 are alternately conductive and completely nonconductive, respectively, in the absence of the storage of an initial free charge.

In lieu of the junction transistors referred to above, for which transistors of opposite conductivity type may alternatively be substituted along with reversal of the polarities of all the rectifiers and all the voltages, it is also possible to use point-contact transistors of the current-amplification type (collector-emitter current-amplification factor in excess of unity), the objections against point-contact transistors then being far less stringent than in conventional trigger circuits, since the current through them becomes zero after each control pulse. The advantage of utilizing current-amplifying transistors consists in the high switching sensitivity, since the floating base, as is known, effects a strong positive coupling and, by its nature, converts the transistor into a bistable trigger. If desired, photo-transistors may alternatively be employed, wherein the initial free storage may be produced by light impulses.

While the invention has been described by means of specific examples and in specific embodiments, we do not wish to be limited thereto, and obvious modifications will occur to those skilled in the art without departing from the spirit and scope of the invention.

What is claimed is:

1. A memory circuit comprising a transistor having an emitter, a collector, and a base which has the property of storing a free charge in response to current passed therein, a rectifier connected in the base circuit of said transistor, said rectifier being polarized in the same current-passing direction as said base, means connected to selectively apply current to said base to cause a free charge to be stored in said base, and an output circuit including a source of control pulses and means connected to selectively apply said control pulses through the emitter-collector path of said transistor whereby an output signal is selectively produced in said output circuit in accordance with the presence or absence of said free charge stored in said base, said control pulses constituting the sole source of operating potential for said emitter-collector path.

2. A memory system comprising a plurality of odd- and even-numbered cascade-connected stages each containing a transistor having an emitter, a collector, and a base which has the property of storing a free charge in response to current passed therein, means connected to selectively apply current to the base of a first one of said transistors to cause a free charge to be stored therein, an output circuit including a source of control pulses and means connected to apply said control pulses through the emitter-collector path of said first transistor whereby an output signal is selectively produced in said output circuit in accordance with the presence or absence of said free charge stored in the base of said first transistor, and a rectifier connected in series between said output circuit and the base of a second one of said transistors and polarized in the same current-passing direction as said last-mentioned base thereby to apply said output signal to said base of the second transistor and permitting said base of the second transistor to store a free charge in accordance with said output signal, said control pulses constituting the sole source of operating potential for said emitter-collector path.

3. A system as claimed in claim 2, including means for producing an erase pulse and means connected to apply said erase pulse to the base of said first transistor after the occurrence of said control pulse thereby to neutralize the free charge of said base of the first transistor.

4. A system as claimed in claim 3, in which said means for producing an erase pulse comprises a differentiating network having input terminals coupled to said source of control pulses.

5. A system as claimed in claim 4, including a rectifier connected between said differentiating network and said base of the first transistor, said last-named rectifier being polarized to pass the differentiated trailing edge of said control pulse.

6. A system as claimed in claim 2, including a second source of control pulses which respectively occur after the occurrences of said first-named control pulses, and a final output circuit including means connected to selectively apply said second control pulses through the emitter-collector path of said second transistor whereby a final output signal is selectively produced in said final output circuit in accordance with the presence or absence of a free charge stored in the base of said second transistor, said second source of control pulses constituting the sole source of operating potential for the emitter-collector path of said second transistor.

7. A system as claimed in claim 6, including a first differentiating network connected to receive said first control pulses, rectifiers connected respectively between said differentiating network and the bases of the transistors in the odd-numbered ones of said cascade-connected stages and polarized to pass the differentiated trailing edges of said first control pulses, a second differentiating network connected to receive said second control pulses, and rectifiers connected respectively between said second differentiating network and the bases of the transistors in the even-numbered ones of said cascade-connected stages and polarized to pass the differentiated trailing edges of said second control pulses.

8. A system as claimed in claim 2, in which said output circuit includes an impedance member connected between electrical ground and the emitter of said first transistor, said rectifier being connected between the last-mentioned emitter and the base of said second transistor, and said source of control pulses being connected between the electrical ground and the collector of said first transistor.

9. A system as claimed in claim 2, including a magnetic-core memory unit interposed between said output circuit and said rectifier and having a first winding connected to said output circuit and a second winding connected to said rectifier, and means connected to control the remanence of said core.

10. A memory system comprising two transistors each having an emitter, a collector, and a base which has the property of storing a free charge in response to current passed therein, sources of control pulses connected respectively to said collectors and having return paths, said control pulses occurring at different times, two rectifiers respectively cross-connected each from the base of a different one of said transistors to the emitter of the other one of said transistors, said rectifiers each being polarized in the same current-passing direction as the base to which it is connected, and impedance members respectively connected between said emitters and said return paths, said control pulses constituting the sole source of operating potential for said collectors.

11. A memory system comprising two transistors each having an emitter, a collector, and a base which has the property of storing a free charge in response to current passed therein, two impedance members respectively connected at ends thereof to said collectors, two sources of control pulses which occur alternately and respectively connected between the remaining ends of said impedances and the emitters of the associated transistors, and two rectifiers respectively cross-connected each from the base of a different one of said transistors to the collector of the other one of said transistors, said rectifiers each being polarized in the same current-passing direction as the base to which it is connected, said control pulses constituting the sole sources of operating potential for said transistors.

12. A system as claimed in claim 11, including a source of collector threshold voltage, and impedance means coupling said source of threshold voltage to said collectors.

13. A memory system comprising two transistors of opposite conductivity types and each having an emitter, a collector, and a base which has the property of storing a free charge in response to current passed therein, an impedance member connected at an end thereof to both of said emitters, two rectifiers respectively connected between said bases and the remaining end of said impedance member, each of said rectifiers being polarized in the same current-passing direction as the base to which it is connected, and two sources of control pulses which occur alternately and respectively connected between said collectors and said remaining end of the impedance member, said control pulses constituting the sole sources of operating potential for said transistors.

14. A memory system including a plurality of cascade connected electrical binary memory stages, each of said stages comprising a single transistor having a base region operating as a memory element and base, emitter and collector electrodes, each transistor having an emitter-collector circuit including a load impedance, a source of control pulses connected to said emitter-collector circuits, said pulses having a polarity to bias said emitter and collector electrodes in the forward and reverse directions, respectively, said control pulses being alternately applied to successive transistors, means connected to selectively apply a forward input pulse to the base electrode of the transistor of the first of said cascade connected stages to cause free charge carriers to be stored in the base region of said transistor, said control pulses constituting the sole source of operating potential for said emitter-collector circuits, and rectifiers connecting the load-impedance of the emitter-collector circuit of the transistor of each stage to the base electrode of the transistor of the next following stage, said rectifiers being connected with a polarity such as to conduct a forward pulse derived from the relevant emitter-collector circuit to the base electrode of the transistor of the next following stage and to prevent free charge carriers set up within said base region of the transistor of said next following stage from leaking away from said base region during the time interval between the occurrence of said forward input pulse and the occurrence of the next following control pulse applied to the emitter-collector circuit of the transistor of said next following stage.

References Cited in the file of this patent

UNITED STATES PATENTS

| | | |
|---|---|---|
| 2,594,336 | Mohr | Apr. 29, 1952 |
| 2,644,892 | Gehman | July 7, 1953 |
| 2,644,893 | Gehman | July 7, 1953 |
| 2,644,897 | Lo | July 7, 1953 |
| 2,717,372 | Anderson | Sept. 6, 1955 |
| 2,737,587 | Trousdale | Mar. 6, 1956 |
| 2,787,712 | Priebe et al. | Apr. 12, 1957 |
| 2,802,067 | Zawels | Aug. 6, 1957 |
| 2,831,986 | Sumner | Apr. 22, 1958 |
| 2,850,630 | Prugh | Sept. 2, 1958 |
| 2,851,220 | Kimes | Sept. 9, 1958 |
| 2,860,259 | Odell et al. | Nov. 11, 1958 |
| 2,864,961 | Lohman et al. | Dec. 16, 1958 |
| 2,877,357 | Pearsall et al. | Mar. 10, 1959 |
| 2,910,596 | Carlson | Oct. 27, 1959 |